April 7, 1931. S. NISHIMURA 1,800,096
KITCHEN UTENSIL
Filed April 18, 1930 2 Sheets-Sheet 1
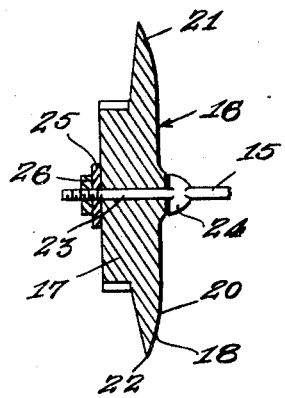
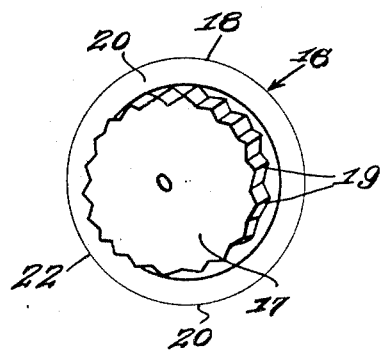
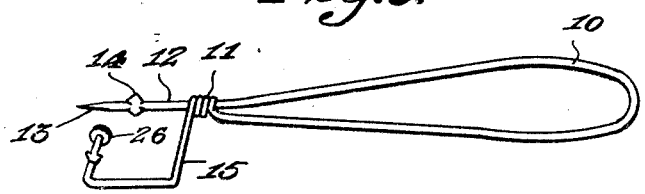
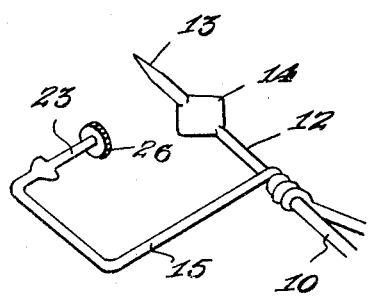
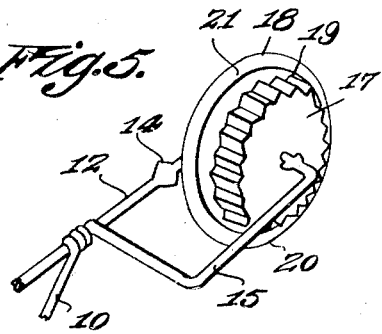
Shinichi Nishimura
INVENTOR
BY Victor J. Evans
ATTORNEY April 7, 1931.  S. NISHIMURA  1,800,096
KITCHEN UTENSIL
Filed April 18, 1930   2 Sheets-Sheet 2

Shinichi Nishimura, INVENTOR
BY Victor J. Evans
ATTORNEY

Patented Apr. 7, 1931

1,800,096

UNITED STATES PATENT OFFICE

SHINICHI NISHIMURA, OF HONOLULU, TERRITORY OF HAWAII

KITCHEN UTENSIL

Application filed April 18, 1930. Serial No. 445,457.

This invention relates to certain new and useful improvements in the culinary art in the nature of a tool for crimping and cutting pie crust.

Another object of the invention consists in the provision and arrangement of means whereby the tool may be guided in a circuitous course for cutting out biscuits and other articles of pastry.

A further object of the invention contemplates the arrangement of a lid remover upon the tool to be guided peripherally of the lid by the pie crust cutter and crimper during the removing thereof.

With the above and other objects in view, the invention further consists of the following novel features and details of construction, to be hereinafter more fully described, illustrated in the accompanying drawings and pointed out in the appended claim.

In the drawings:

Figure 1 is a sectional view taken on line 1—1 of Figure 8.

Figure 2 is a perspective view of the combination pie crimper and dough cutter.

Figure 3 is a perspective view of the holding apparatus.

Figure 4 is an enlarged fragmentary perspective view of the supporting structure.

Figure 5 is a view similar to Figure 4 showing the combination pie crimper and dough cutter applied.

Figure 8 illustrates the manner of removing closure lids for cans and the like.

Figure 7:
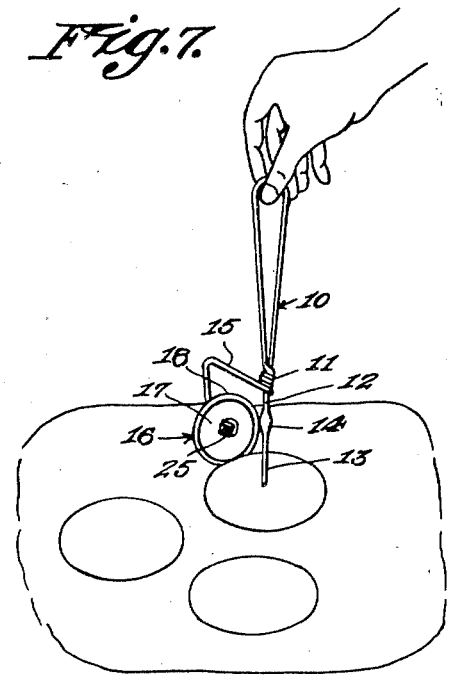
Figure 7 is a perspective view illustrative of the manner of employment of the invention for cutting out biscuits and other articles of pastry from a sheet of dough.

Referring to the drawings in detail wherein like characters of reference denote corresponding parts, the reference character 10 indicates generally a length of wire or other flexible material bent upon itself to provide a handle portion, preferably of loop formation; the ends of which being twisted one upon the other, as at 11, adjacent the extremities thereof whereby independent shifting movement of either of the sections of the handle will be prevented. The end 12 of the length of wire extending outwardly in alignment with the component section of the handle terminates to provide a penetrating extremity 13 for the puncturing of milk bottle caps and to penetrate dough and the like in the manner suggested in Figure 7 of the drawings when the invention is used as a pair of compasses in the inscribing and cutting out of biscuit forms from dough sheets.

Figure 8:
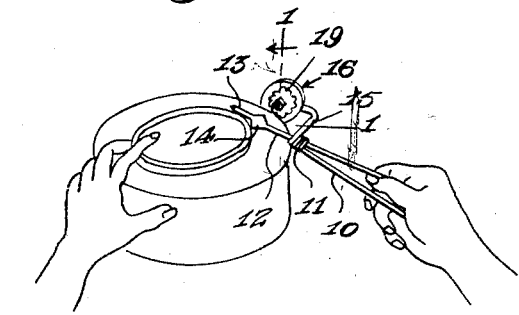
Figure 9:
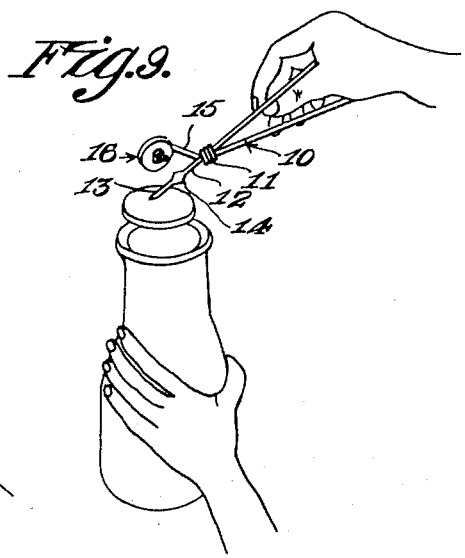
Figure 9 shows the manner of removing milk bottle caps designed to be subsequently replaced evenly upon the shoulder within the neck of the milk bottle when the combination pie crimper and dough cutter is employed as a fulcrum upon the neck of the bottle.

Tabs or ears, such as indicated at 14, carried by and outwardly projecting from diametrically opposite sides of the end 12 in the manner shown are to be employed as shown in Figure 8 in a manner to be better understood in the following description of the invention. The other end 15 of the handle is of L shape formation and disposed at right angles to the end 12 in the manner suggested in Figures 4 and 5 of the drawings. The combination pie crimper and dough cutter comprises a wheel structure 16 having large and small disks 17 and 18 formed upon opposite sides thereof.

Figure 6:
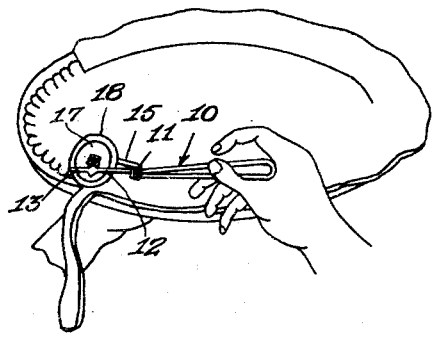
Figure 6 is illustrative of the manner of employment of the tool for simultaneously crimping and cutting the dough about the peripheral edge of a pie pan.

The peripheral edge of the smaller disk 17 is toothed or crimped, as at 19, whereas the opposed sides of the disk 18 beyond the teeth 19 are oppositely beveled, as at 20 and 21, meeting at common points circumferentially of the horizontal axis of the wheel structure to provide a peripheral cutting edge 22. The wheel structure is designed for accommodation upon the shorter end 23 of the L-shaped end 15 in the manner shown in Figure 1 of the drawings; disk 18 reposing against a shoulder portion or stop 24 whereas the outer surface of the disk 17 operates against a spacing washer 25 adjustably positioned through the employment of a nut 26 threadedly secured upon the outermost end of the shorter end 23. Such construction will facilitate interchanging and reversing of the wheel structure position when it is desired to employ the invention for cutting and crimping pie crust as shown in Figure 6 or removing can lids in the manner illustrated in Figure 8. In the latter instance, the tabs or ears 14 are employed for the purpose of projecting beneath the under side of the annular flange carried by closure lids. The disk 17 will ride around upon the upper side and peripheral edge of the can body and that portion of the disk 18 projecting beyond the toothed periphery of the disk 17 will act as a guide to restrict the inner position of the tab or ear 14 now in use, that is, whether the invention is being operated by a right handed or left handed person.

As mentioned in the foregoing, the culinary tool is also to be employed for the purpose of removing and replacing milk bottle caps and the like by puncturing same centrally thereof by the pointed extremity 13 of the end 12. The disk 17 will repose upon the upper portion of the bottle neck and act as a fulcrum for the entire tool during the removal and replacement of the bottle cap.

The invention is susceptible of various changes in its form, proportions and minor details of construction, and the right is herein reserved to make such changes as properly fall within the scope of the appended claim.

Having described the invention, what is claimed is:

A culinary tool comprising a length of wire having the ends thereof cooperatively associated to provide a handle, one of the ends terminating to provide a penetrating extremity projecting rectilinearly of the handle, the other end of the handle being of L-shape formation disposing the extremity thereof at right angles to the penetrating extremity, a wheel structure having large and small disks provided with sharpened and crimped peripheries respectively and journaled upon the rightangularly disposed end of the L-shaped end, and ears arranged upon diametrically opposite sides of the penetrating extremity.

In testimony whereof I affix my signature.

SHINICHI NISHIMURA.